United States Patent [19]
Den Hollander

[11] Patent Number: 5,558,819
[45] Date of Patent: Sep. 24, 1996

[54] DOWNFLOW HEATER PLANT FOR BRIEFLY HEATING A LIQUID WITH STEAM

[75] Inventor: Adriaan G. Den Hollander, Gorinchem, Netherlands

[73] Assignee: Den Hollander Engineering B.V., Gorinchem, Netherlands

[21] Appl. No.: 256,076

[22] PCT Filed: Dec. 24, 1992

[86] PCT No.: PCT/NL92/00236

§ 371 Date: Sep. 26, 1994

§ 102(e) Date: Sep. 26, 1994

[87] PCT Pub. No.: WO93/12673

PCT Pub. Date: Jul. 8, 1993

[30] Foreign Application Priority Data

Dec. 24, 1991 [NL] Netherlands ............................ 9102185

[51] Int. Cl.⁶ ..................................................... B01F 3/04
[52] U.S. Cl. ................... 261/21; 261/116; 261/DIG. 76; 426/511; 426/522
[58] Field of Search ..................................... 426/511, 522; 261/DIG. 76, DIG. 10, DIG. 32, 21, 116

[56] References Cited

U.S. PATENT DOCUMENTS

| | | | |
|---|---|---|---|
| Re. 32,695 | 6/1988 | Nahra et al. | |
| 1,399,294 | 12/1921 | Engle, Sr. | 261/DIG. 10 |
| 1,435,464 | 11/1922 | Grindrod | 426/511 |
| 2,401,077 | 5/1946 | Johnston | 426/511 |
| 2,435,424 | 2/1948 | Crews | |
| 2,899,320 | 8/1959 | Davies et al. | 426/511 |
| 3,511,481 | 5/1970 | Daltry | 261/DIg. 10 |
| 3,771,434 | 11/1973 | Davies | |
| 4,394,139 | 7/1983 | Board | 261/DIG. 10 |
| 4,461,780 | 7/1984 | Menacci | 426/511 |

FOREIGN PATENT DOCUMENTS

| | | | |
|---|---|---|---|
| 610233 | 2/1991 | Australia | |
| 0210887 | 2/1987 | European Pat. Off. | |
| 0213644 | 3/1987 | European Pat. Off. | |
| 617897 | 10/1994 | European Pat. Off. | 426/522 |
| 398959 | 6/1909 | France | 261/DIG. 33 |
| 932854 | 4/1948 | France | |
| 2561073 | 9/1985 | France | 426/522 |
| 2562224 | 10/1985 | France | |
| 167563 | 2/1906 | Germany | 261/DIG. 32 |
| 241968 | 11/1909 | Germany | 261/DIG. 32 |
| 241627 | 11/1910 | Germany | 261/DIG. 32 |
| 74445 | 4/1954 | Netherlands | |

OTHER PUBLICATIONS

"Direct sterilization of Heat–Sensitive Fluids by a Free-–Falling–Film Sterilizer", *Institute of Food Technologists*, vol. 34, No. 9, pp. 49–55, Sep. 1980, Chicago by J. E. Nahra et al.

*Primary Examiner*—Tim R. Miles
*Attorney, Agent, or Firm*—Thompson & Young

[57] ABSTRACT

Plant for briefly heating a free-falling liquid in a pressure chamber (9) by stream which is also supplied to the pressure chamber. The liquid is supplied to the pressure chamber through a supply plate (42) provided with channels (44) and the resulting liquid jets are brought into contact with the steam. Over the thickness of the plate a temperature gradient is maintained at the level of the difference between the steam temperature and the supply temperature of the liquid. The flow direction of the steam in the pressure chamber is essentially equal to the flow direction of the liquid jets. The plate is of plastic so as to have a low coefficient of thermal conductivity. Alternatively, the plate can have cooling channels to keep its upper surface desirably cooler than its under surface.

8 Claims, 5 Drawing Sheets

# DOWNFLOW HEATER PLANT FOR BRIEFLY HEATING A LIQUID WITH STEAM

The invention relates to a device for briefly heating a liquid, comprising: a pressure chamber, at least one liquid supply channel, opening out into the pressure chamber, for supplying the liquid at a first temperature to the pressure chamber at a predetermined first level; at least one liquid discharge channel, originating in the pressure chamber, for discharging the liquid from the pressure chamber from a predetermined second level lying lower than the first level; and at least one steam supply channel, opening out into the pressure chamber, for supplying steam under pressure to the pressure chamber, the steam temperature being higher than the first temperature of the liquid.

Such a device is generally known and is used in, for example, the food industry for reducing the number of disease germs in liquid foods such as milk through brief heating. In this case the liquid is supplied under pressure from the liquid supply channel to the pressure chamber, where the liquid is brought into contact with the steam. This causes the liquid to heat up very quickly during a free fall thereof through the pressure chamber to a liquid discharge channel. Prior to the discharge of the liquid from the pressure chamber, the liquid is collected for some time still in the pressure chamber, in order to ensure that all liquid brought into the pressure chamber reaches a certain temperature. The liquid is then discharged to a cooling device for cooling down the liquid and if necessary evaporating any water absorbed by the liquid as a result of the heat treatment by means of steam.

In the known devices the liquid to be heated is brought into the pressure chamber in the form of films. Although in this case there is a relatively large contact face for the exchange of heat between the liquid and the steam, uniform distribution of the steam along the films is difficult to achieve and maintain. Furthermore, such a device can be used only for certain liquids and in a limited working field, because the films must be prevented from breaking or, after the liquid has fallen over a certain height, from deforming too much, which greatly reduces the effectiveness of the heat transfer from the steam to the liquid.

Another commonly occurring problem in the known heater devices is the soiling gradually occurring therein as a result of the precipitation of constituents of the liquid on parts of the pressure chamber heated by the steam, in particular where the liquid is brought out of the liquid supply channel into the pressure chamber. If such precipitations can occur, they constitute a serious threat to good progression of the heating process as such and, furthermore, specifically in the processing of liquid foods, undesirable off-flavours may result. Any precipitations which may occur are difficult to remove from the heater plant, which has to be taken out of operation for this purpose, and in some cases even has to be partially dismantled.

Finally, it should be pointed out that too long a residence time in the pressure chamber in the case of liquid foods may likewise lead to undesirable off-flavours, and also to an unacceptable denaturation.

The object of the invention is to provide a downflow heater plant in which a liquid can be heated to a high temperature in a very short time.

Another object of the invention is to provide a downflow heater plant which can be used for heating numerous liquids, including highly viscous liquids.

A further object of the invention is to provide a downflow heater plant which can be adapted simply to the desired operating conditions, such as capacity, heating duration, maximum heating temperature and the like.

Another object of the invention is to provide a downflow heater plant in which the precipitation of constituents of the liquid to be heated is largely prevented.

For this purpose the downflow heater plant according to the invention is characterised in that a supply plate provided with a number of plate channels for forming a number of liquid jets in the pressure chamber is placed in the mouth of the liquid supply channel, while a temperature gradient at the level of the difference between the steam temperature and the first temperature of the liquid is maintained between the side of the supply plate facing the pressure chamber and the side facing the liquid supply channel, viewed in the direction of the plate channels. Through a suitable arrangement of the plate channels, which can have, for example, a round, oval or square cross-section, it can be ensured that the liquid to be heated is uniformly distributed in the pressure chamber. The liquid jets, which can be very elongated and thereby retain their shape, have a relatively large contact face for exchanging heat with the steam, with the result that a very rapid heating of the liquid occurs in the pressure chamber. The capacity of the downflow heater plant can be selected within wide limits through a suitable selection of the number of plate channels in the supply plate, the hydraulic diameter thereof and the flow velocity of the liquid in the plate channels. It is not necessary to collect the liquid in the pressure chamber in order to increase the effect of the heating; the residence time of the liquid in the pressure chamber can therefore remain restricted to a minimum, and in the treatment of foods only very slight denaturation and off-flavours occur.

The liquid jets are preferably directed essentially in the same direction as the flow of the steam inside the pressure chamber. Condensation of steam on the liquid jets will cause the flow direction of the steam in the downstream direction to acquire a gradually increasing radial component directed towards the centre of the collection of liquid jets.

With the direction of flow of steam which occurs, optimum heat transfer of the steam to the liquid jets is obtained if the plate channels are fitted in the supply plate along lines directed radially outwards from the centre of the supply plate. In this case it is preferable to select the ratio between the sum of the surface areas of the cross-sections of the plate channels and the surface area of the cross-section of the liquid supply channel near the supply plate in such a way that it is greater than 0.02 and smaller than 0.1.

In a preferred embodiment the plate channels have an inflow aperture which tapers in the liquid flow direction. Such a configuration promotes uniform flow of the liquid along the edge of the inflow apertures, with the result that precipitation of constituents of the liquid near the inflow apertures of the plate channels is prevented.

In a further preferred embodiment the plate channels have an annular outflow aperture which is formed by a collar of which the cross-section tapers in the liquid flow direction. Such a shape of the outflow apertures prevents the liquid jets from fanning out after they leave the plate channels, and thus also prevents precipitation of constituents of the liquid near the outflow apertures, where the temperature of the supply plate locally is approximately the same as the temperature of the steam supplied to the pressure chamber.

In general, the liquid supply channel has a relatively small cross-section compared with the surface area of the part of the supply plate provided with plate channels, which means that the liquid supply channel widens considerably upstream relative to the supply plate in the direction of flow. In order to avoid pressure differences over the cross-section of the liquid supply channel near the inflow apertures of the plate channels, one or more perforated liquid distribution plates are fitted in the liquid supply channel upstream relative to the supply plate and at a distance therefrom.

In a particularly advantageous embodiment the supply plate comprises a material with a low coefficient of thermal conductivity. If the thickness of the supply plate is suitably chosen, the desired temperature gradient over the supply plate in that case establishes itself independently. If the material of the supply plate has a coefficient of thermal conductivity which is not low enough, it is advantageous to provide the supply plate with one or more cooling channels in which a cooling agent can flow. The cooling channels, which do not intersect the plate channels, in this case ensure that the desired temperature gradient is established over the supply plate.

In a preferred embodiment of the downflow heater plant the pressure chamber is formed by a hollow cylinder with a vertical axis, which pressure chamber tapers in a conical shape at the bottom side and merges into the liquid discharge channel, while the pressure chamber is shut off at its top side by a cover through which a liquid discharge pipe is conveyed, at one end of an insulated part of which pipe projecting into the pressure chamber the supply plate is fitted, and the steam can be supplied through a steam supply aperture to the pressure chamber at the level of the supply pipe. At a certain axial length of the pressure chamber the height of fall can be adjusted simply by making the part of the liquid supply pipe projecting into the pressure chamber a suitable length. It is also possible to place the liquid supply pipe so that it is axially movable in the cylindrical pressure chamber, as a result of which the height of fall of the liquid in the pressure chamber is adjustable. In order to prevent precipitation of the constituents of the liquid against the inside wall of the liquid supply pipe, a heat-insulating material is provided all the way round the part of the liquid supply pipe projecting into the pressure chamber.

It is advantageous if one or more perforated steam distribution plates are provided between the inside wall of the cylinder and the outside wall of the liquid supply pipe, below the steam supply aperture. This ensures that the steam is uniformly distributed and guided in the direction of the liquid jets inside the pressure chamber.

It is possible to connect a number of downflow heater devices in series, for heating a liquid in several stages, with the result that a very great saving in the quantity of steam required can be achieved. For this, the liquid supply channel of each device is connected to the liquid discharge channel of the device directly upstream, the liquid discharge channel of the device furthest downstream is connected to a supply channel of a cooling device fop separating liquid and steam, and the steam separated off in the cooling device is supplied to one or more of the last but one and upstream devices through the steam supply channel thereof. More particularly, the cooling device is made up of a number of partial cooling devices connected in series, the steam separated off in the respective first and downstream partial cooling devices being supplied to the respective last but one and upstream devices.

The invention is explained with reference to the drawing, in which:

FIG. 7 shows a part of a flow chart of a multi-stage sterilisation process, in which several downflow heater devices according to the invention are incorporated.

The same reference numbers relate to identical elements.

Figure 1:
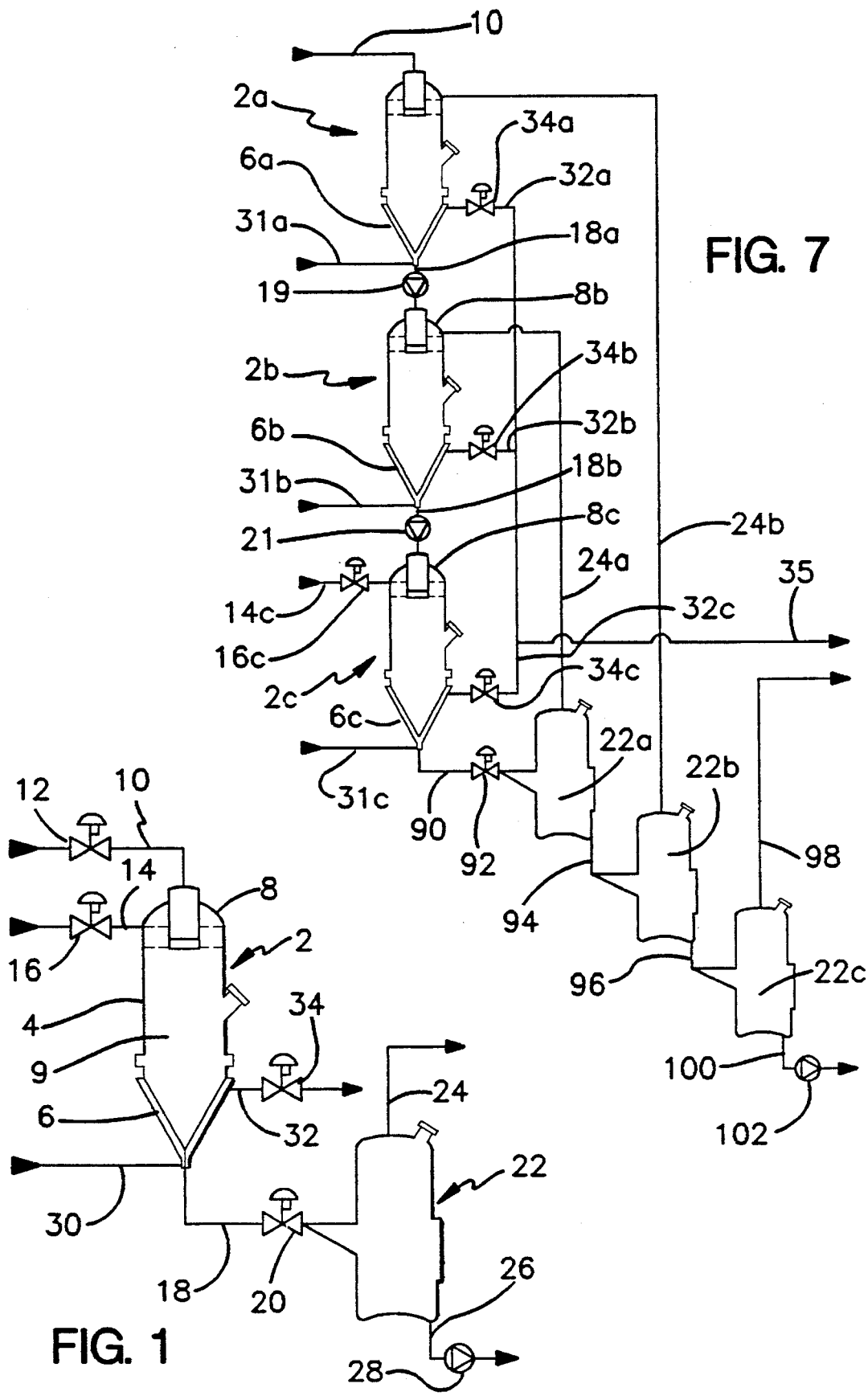
FIG. 1 shows a part of a flow chart of a sterilisation process in which the downflow heater device according to the invention is incorporated.

FIG. 1 shows diagrammatically a downflow heater device 2, comprising a round, cylindrical central part 4, which continues at its bottom side into a conical bottom part 6, and at the top end thereof is shut off by a cover 8. Further details will be explained below with reference to FIGS. 2–6. The liquid to be heated is conveyed into the pressure chamber 9 through the cover 8 of the downflow heater device 2 by way of a pipe 10 in which a control valve 12 is provided, which pressure chamber is formed by the central part 4, the bottom part 6 and the cover 8. Steam is supplied into the top zone of the central part 4 of the pressure chamber 9 through a steam pipe 14 containing a control valve 16. The liquid supplied through the pipe 10 falls through the force of gravity into the pressure chamber 9, virtually vertically downwards, and is heated in the process by the steam conveyed into the pressure chamber 9 through pipe 14. After the free fall of the liquid in the downflow heater device 2, the liquid reaches the bottom part 6 and passes through a pipe 18, in which a control valve 20 is provided, into a liquid/steam separator 22, where the liquid/steam mixture is cooled down through a very rapid expansion thereof, and the separated steam is conveyed through a pipe 24 to a condenser, while the separated liquid is pumped away through a pipe 26 by means of a pipe 28, for a subsequent processing stage. The bottom part 6 of the downflow heater device 2 is cooled by a system of pipes provided therein, to which system a cooling fluid is supplied through pipe 30, which cooling fluid is discharged through pipe 32, in which a control valve 34 is provided, to a condenser.

Figure 2:
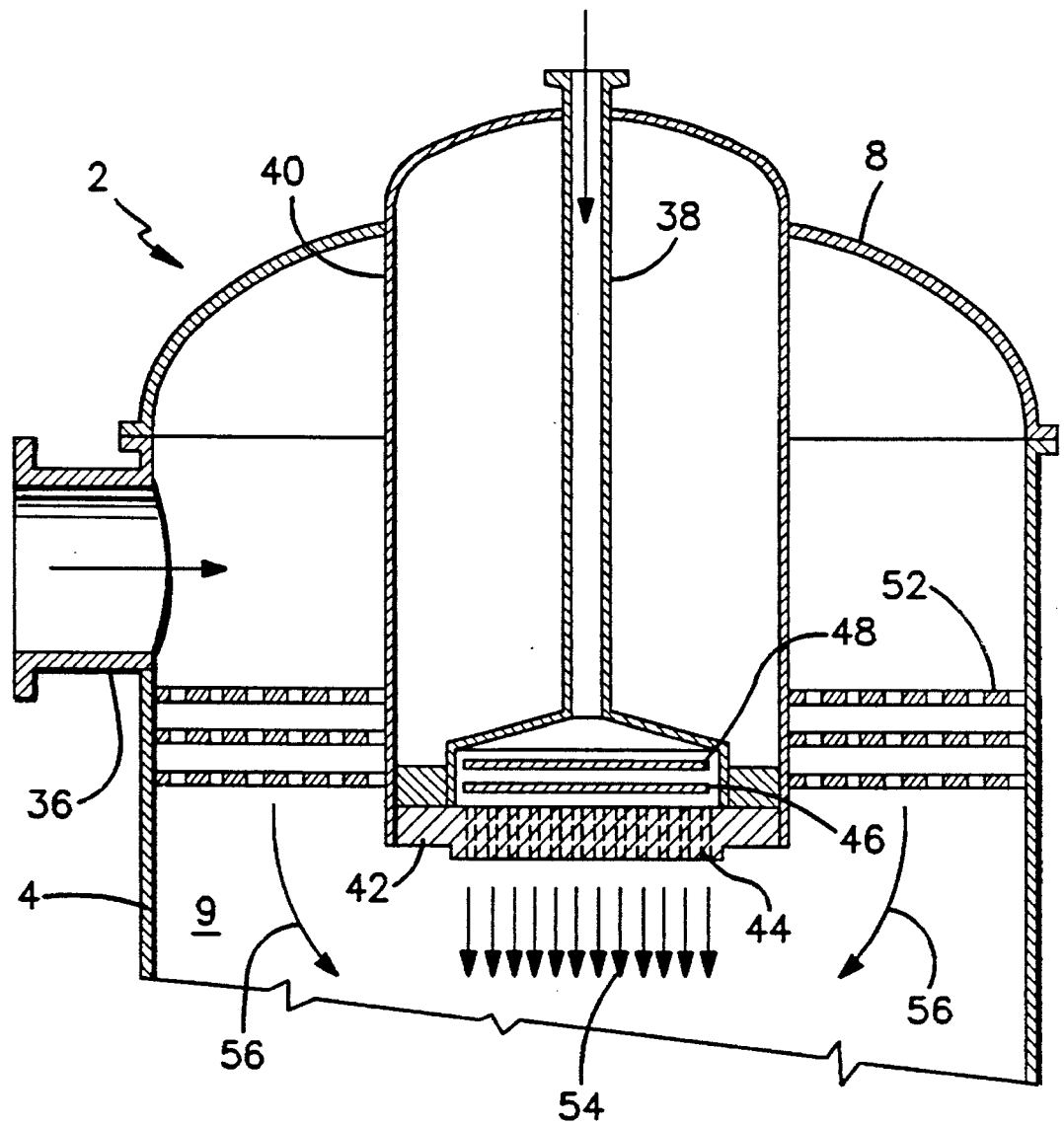
FIG. 2 shows diagrammatically a cross-section of the top part of the downflow heater plant according to the invention.

FIG. 2 shows a part of a steam supply channel 36, through which steam can be supplied to the top part of the pressure chamber 9, which is bounded by the central part 4 and the cover 8. A liquid supply channel is accommodated in a dome 40, the bottom of which is formed by a supply plate 42 which is provided with a number of plate channels 44. The supply plate 42 is fixed on a flange 46 fitted along the inside wall of the dome 40. The liquid supply channel widens near the supply plate 42. A number of perforated liquid distribution plates 48, which ensure a uniform distribution of the liquid supplied by the liquid supply channel 38 over the cross-section of the part of the supply plate 42 provided with plate channels 44, are provided in the widened part of the liquid supply channel 38. The liquid supply channel 38 is thermally insulated from the pressure chamber 9 over its entire length by a suitable insulating material 50, such as a mineral wool or an insulating foam. A number of perforated steam distribution plates are fitted in the pressure chamber 9 between the inside wall of the central part 4 and the outside wall of the dome 40.

In the downflow heater device 2 shown in FIG. 2 the liquid supplied to the pressure chamber 9 through the liquid supply channel 38, the liquid distribution plates 48 and the plate channels 44 falls through the force of gravity in the direction indicated by arrows 54. The steam supplied to the pressure chamber 9 through the steam supply channel 36 and through the steam distribution plates 52 flows in general in the direction indicated by the arrows 56, i.e. essentially parallel to the liquid jets.

Figure 3:
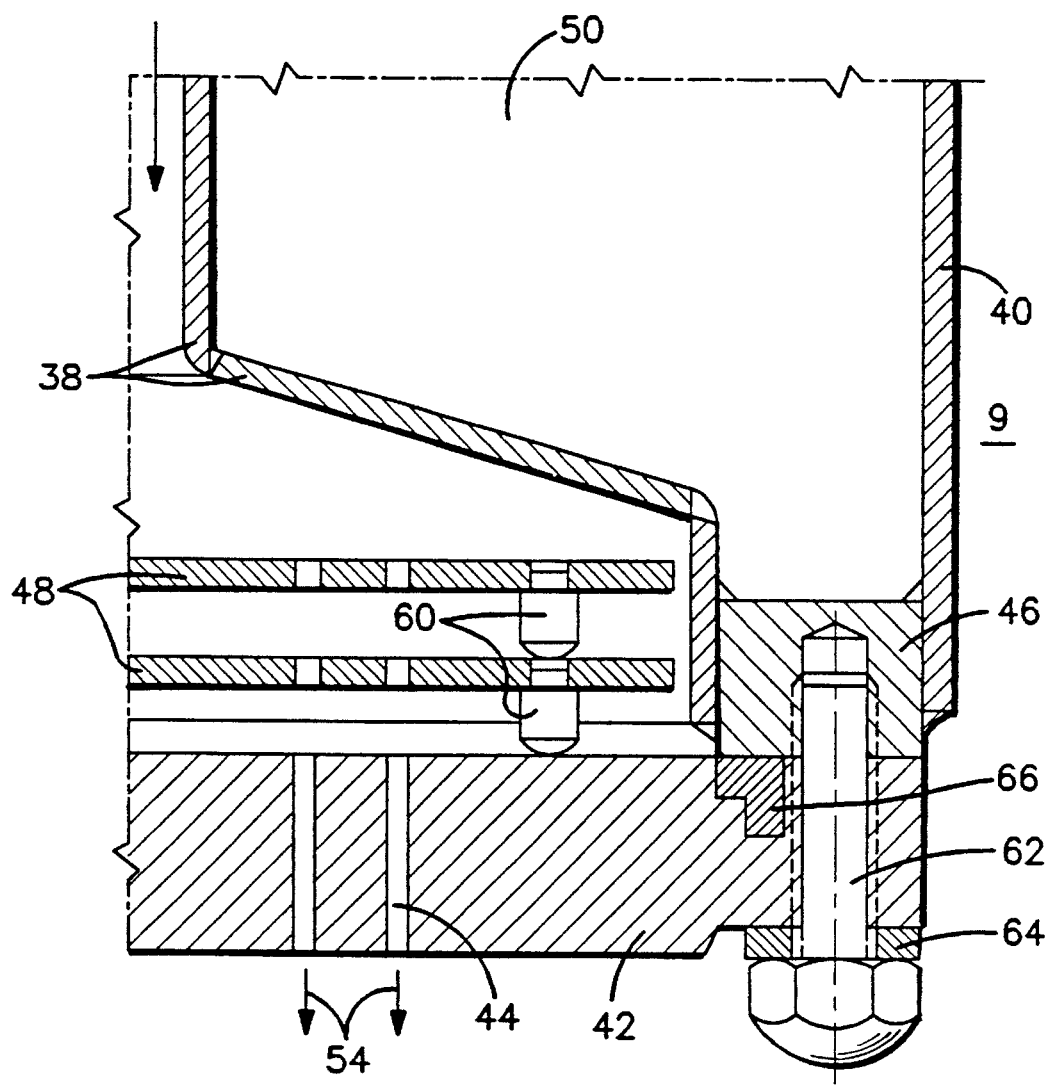
FIG. 3 shows a detail of the cross-section according to FIG. 2, on an enlarged scale.

FIG. 3 shows in detail the design of the downflow heater device near the mouth of the liquid supply channel 38. The liquid distribution plates 48 are provided with spacers 60 on the bottom side along the periphery thereof, for maintaining a certain distance between the individual liquid distribution plates 48 and between the bottom liquid distribution plate and the supply plate 42. The supply plate 42 is fixed to the flange 46 by means of a number of bolts 62, which are provided along the periphery of the supply plate 42, and the heads of which press the top edge of the supply plate 42 against the bottom side of the flange 46 by means of washers 64. A gasket 66 is provided at the position of the contact face between the supply plate 42 and the flange 46, in order to prevent leaking of the liquid out of the liquid supply channel 38 through said contact face to the pressure chamber 9.

Figure 3A:
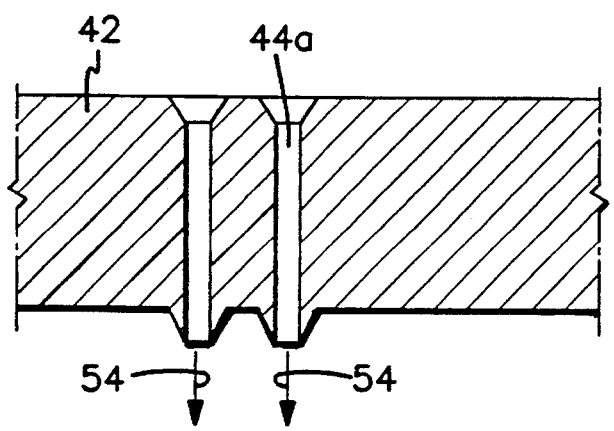
FIG. 3a shows an alternative embodiment of the plate channels shown in FIG. 3.

FIG. 3a shows a special shape of plate channels 44a in the supply plate 42. The inlet side of the plate channels 44a is widened in the upstream direction, and the edge thereof is positioned at, for example, an angle of 45° relative to the axis of the plate channel 44a. At the outlet side the plate channels 44a are provided with a collar, of which the cross-section tapers in the liquid flow direction. The measures at the inlet side and the outlet side of the plate channels 44a ensure that the liquid flows very uniformly into the channels 44a and the liquid jets 54 at the outlet side of the plate channels 44a are sharply bounded and do not fan out. A precipitation of constituents from the liquid at the position of the inlet and outlet side of the plate channels 44a is hereby avoided as much as possible.

The cross-section of the plate channels 44 and 44a is preferably round, but it can also be, for example, oval, square or rectangular.

FIGS. 3 and 3a show only two channels in each plate 42 and 48; in general, however, the perforations of the plates extend over the entire surface of the plate. The number of channels and the dimensions of the cross-section of each channel are adapted to the desired operating conditions in the downflow heater device.

Figure 3B:
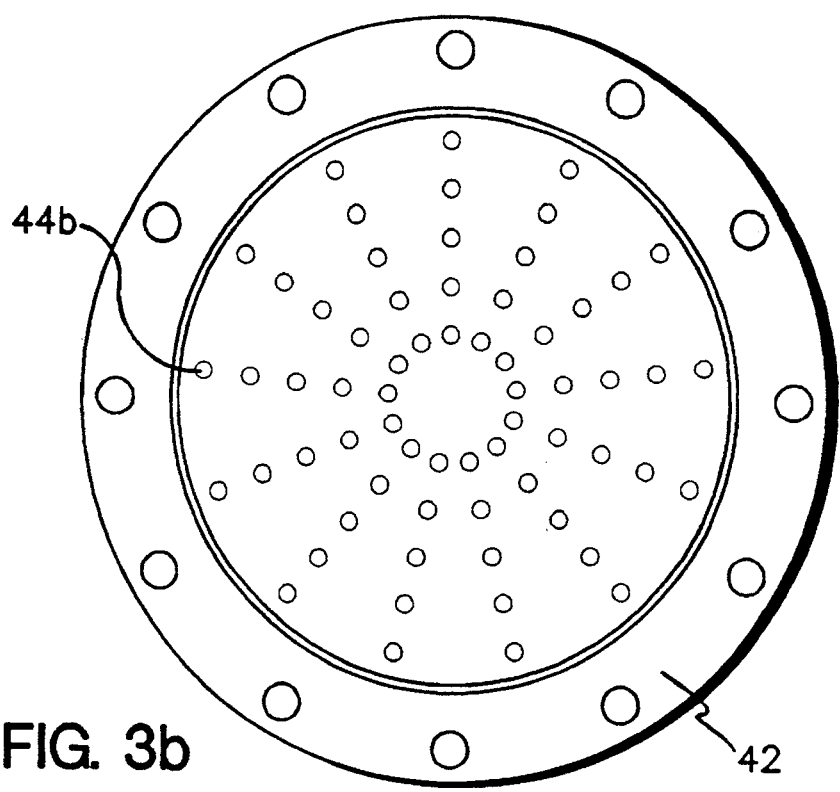
FIG. 3b shows a bottom view of a first embodiment of a supply plate according to FIG. 3, on a reduced scale.

FIG. 3b shows a supply plate 42 which is provided with 65 plate channels 44b with a round cross-section, which are arranged regularly along 13 radial lines originating in the centre of the supply plate.

Figure 3C:
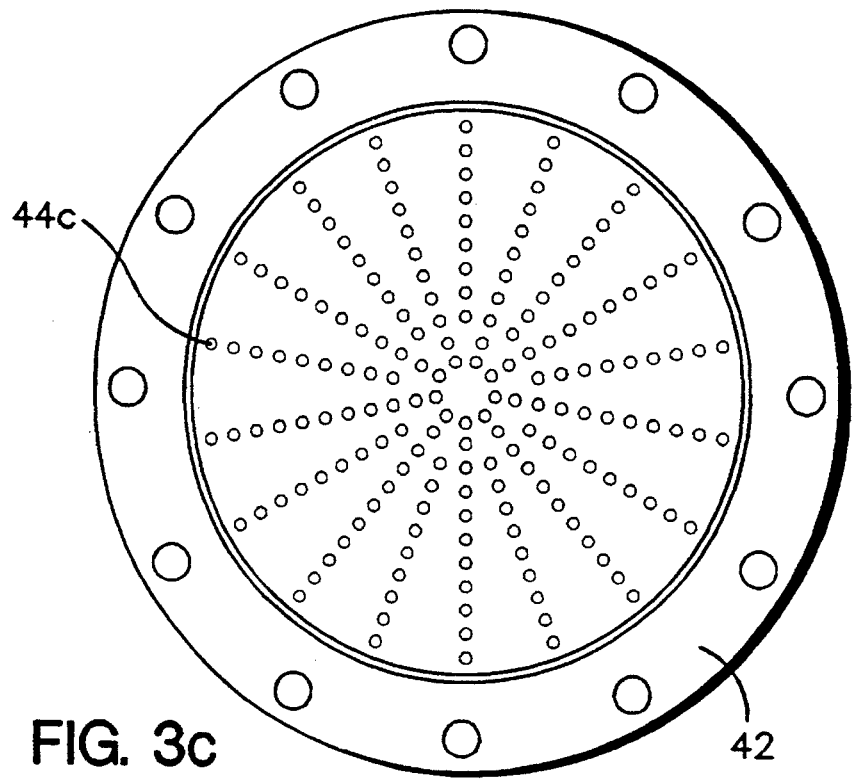
FIG. 3c shows a bottom view of a second embodiment of a supply plate according to FIG. 3, on a reduced scale.

FIG. 3c shows a supply plate 42 which is provided with 180 plate channels 44c with a round cross-section, which are arranged regularly along 18 radial lines originating in the centre of the supply plate.

The ratio between the diameter of a plate channel 44b and the diameter of a plate channel 44c corresponds approximately to the square root of the ratio between the number of plate channels 44b and the number of plate channels 44c. The perforation ratio, i.e. the ratio between the sum of the surface areas of the cross-sections of the plate channels and the surface area of the cross-section of a liquid supply channel near the supply plate, is consequently of the same magnitude and equal to about 3% for the cases shown in FIGS. 3b and 3c.

On the one hand, it is possible to manufacture the supply plate 42 from a material with a low coefficient of thermal conductivity, for example a plastic, and more particularly from polytetrafluoroethylene. This means that in zones with a low liquid flow velocity at the liquid supply side of the supply plate 42 a sufficiently low temperature can be maintained to prevent local precipitation of constituents from the liquid. This effect can, however, also be achieved if a supply plate 42 of a material with a relatively high coefficient of thermal conductivity is used, which supply plate in that case is provided with one or more cooling channels in which a cooling agent can flow.

Figure 4:
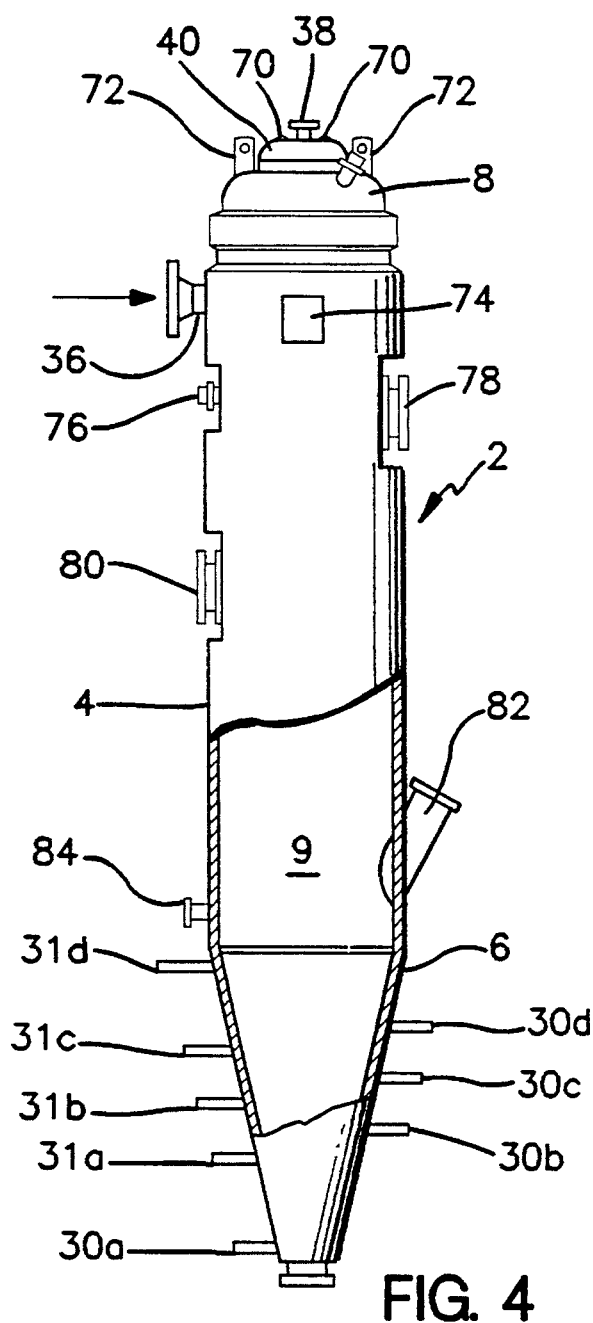
FIG. 4 shows a partially cut-away side view of a downflow heater plant.
Figure 5:
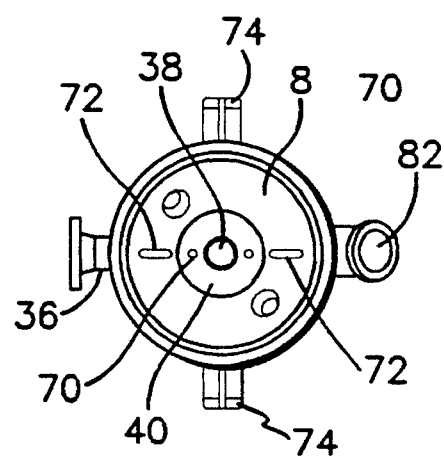
FIG. 5 shows a top view of the plant according to FIG. 4.

FIGS. 4 and 5 show a downflow heater plant 2 with a number of connections and other provisions fitted on the outside thereof. The inlet of the liquid supply channel 38 is provided centrally on the dome 40 in the cover 8. Two caps 70 can also be seen on the dome 40, which caps seal off holes which can be used for supplying insulating material 50 to the space enclosed by the liquid supply channel 38 and the dome 40. Two lifting hooks 72 are fixed on the cover 8, for fitting and removing the cover 8 with the dome 40 during installation or maintenance of the downflow heater device 2. The downflow heater plant can be suspended in a frame (not shown in any further detail) by means of laterally projecting supports 74 fitted on the central part 4. A cleaning connection 76, through which cleaning agent can be supplied into the inside of the downflow heater device, is situated below the steam supply channel 36, for cleaning said device when it is out of operation. Inspection glasses 78, 80 and 82 are fitted at various levels in the side wall of the central part 4, by means of which glasses the phenomena taking place inside the device can be observed. One or more venting connections 84 are placed at the bottom side of the central part 4, so that non-condensable gases can escape from the pressure chamber 9. As FIG. 4 shows, the cooling agent supply pipe 30 shown diagrammatically in Fig. 1 in one embodiment can comprise several cooling agent supply pipes 30a, 30b, 30c and 30d, by means of which cooling agents at the same temperature or at different temperatures can be supplied to cooling channels 86 in the wall of the bottom part 6, and can be discharged through respective cooling agent discharge pipes 31a, 31b, 31c and 31d.

Figure 6:
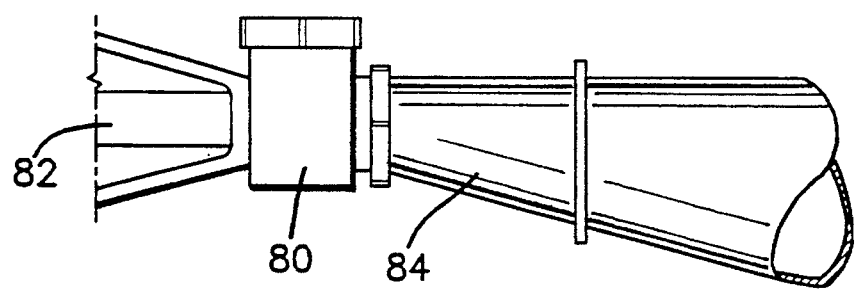
FIG. 6 shows a side view of a liquid discharge channel, on an enlarged scale.

As FIG. 6 shows, a square control cock 80 can be connected at the outlet side of the bottom part 6 of the downflow heater device 2 (FIG. 4), in which case the liquid heated in the pressure chamber 9 can be discharged in a controllable way into a widening liquid discharge channel 84, by controlling the position of a plunger 82. The control of the position of the plunger 82 takes place, for example, by measuring the level of the liquid in the bottom part 6 and implementing such a regulation that the liquid level remains constant and as low as possible. If vacuum prevails in the space bounded by the liquid discharge channel 84, supplying the heated liquid thereto will cause a very rapid cooling (flash cooling).

FIG. 7 shows a number of downflow heater devices 2a, 2b and 2c connected in series, in the case of which the outlet side of a bottom part 6a of downflow heater device 2a is connected by means of a pipe 18a, incorporating a pump 19 to the inlet side of the downflow heater device 2b on the cover 8d. The outlet side of a bottom part 6b of the downflow heater plant 2b is likewise connected by means of a pipe 18d incorporating a pump 21 to the inlet side of the downflow heater device 2c on a cover 8c thereof. The outlet side of the downflow heater device 2c is connected at the underside of the bottom part 6c thereof, by means of a pipe 90 containing a control valve 92, to a liquid/steam separator or cooling device 22a, in the manner already shown in FIG. 1. Steam is supplied to downflow heater device 2b through a steam discharge pipe 24a coming from cooling device 22a. The liquid separated off in the cooling device 22a is supplied through a pipe 94 to a cooling device 22b. The steam separated off in the cooling device 22b is supplied through a pipe 24b to the downflow heater device 2a. The liquid separated off in the cooling device 22b is supplied through a pipe 96 to a following cooling device 22c. The steam separated off in the cooling device 22c is supplied through a pipe 98 to a condenser which is not shown in any further detail. The liquid separated off in the cooling device is discharged for further processing through a pipe 100 incorporating a pump 102. The bottom parts 6a, 6b and 6c are cooled by supplying cooling agents thereto through respective pipes 31a, 31b and 31c, which cooling agents are collected in a pipe 35 and discharged by means of cooling agent discharge pipes 32a, 32b and 32c provided with control valves 34a, 34b and 3c. Fresh steam is supplied to the downflow heater device 2c through a pipe 14c provided with a control valve 16c, for heating the pre-heated liquid supplied thereto in the downflow heater devices 2a and 2b.

In the downflow heater plant according to the invention raw milk at a temperature of approximately 60° C. is heated briefly with the aid of steam at about 155° C. The milk thereby reaches a temperature of approximately 150° C. in less than one second during its free fall in the downflow heater plant. This is sufficient to destroy virtually all disease germs in the milk. It is consequently not necessary to leave the milk for some further time in the pressure chamber, as is customary according to the prior art. The milk can therefore be discharged directly to a cooling device, for example a flash cooler in which the milk is cooled down very rapidly to about 55° C. Due to the ultra-rapid heating and cooling, the flavour of the milk is retained, and virtually no denaturation occurs.

In the multi-stage heater system shown in FIG. 7, at a liquid supply temperature of approximately 60° C. and a maximum heating temperature of 140° C., a steam saving of approximately 62% can be achieved compared with a single system according to FIG. 1.

I claim:

1. In a device for briefly heating a liquid, comprising:

a pressure chamber;

at least one liquid supply channel, opening out into the pressure chamber, for supplying the liquid at a first temperature to the pressure chamber at a predetermined first level;

at least one liquid discharge channel, originating in the pressure chamber, for discharging the liquid from the pressure chamber from a predetermined second level lying lower than the first level;

at least one steam supply channel, opening out into the pressure chamber, for supplying steam under pressure to the pressure chamber, the steam temperature being higher than the first temperature of the liquid;

the improvement comprising a supply plate provided with a number of plate channels for forming a number of liquid jets in the pressure chamber placed in the mouth of the liquid supply channel, the plate being plastic to maintain a temperature gradient at the level of the difference between the steam temperature and the first temperature of the liquid between the side of the supply plate facing the pressure chamber and the side facing the liquid supply channel, viewed in the direction of the plate channels.

2. In a device for briefly heating a liquid, comprising:

a pressure chamber;

at least one liquid supply channel, opening out into the pressure chamber, for supplying the liquid at a first temperature to the pressure chamber at a predetermined first level;

at least one liquid discharge channel, originating in the pressure chamber, for discharging the liquid from the pressure chamber from a predetermined second level lying lower than the first level;

at least one steam supply channel, opening out into the pressure chamber, for supplying steam under pressure to the pressure chamber, the steam temperature being higher than the first temperature of the liquid;

the improvement comprising a supply plate provided with a number of plate channels for forming a number of liquid jets in the pressure chamber placed in the mouth of the liquid supply channel, the plate channels having an annular outflow aperture which is formed by a collar of which the cross-section tapers in the liquid flow direction.

3. In a device for briefly heating a liquid, comprising:

a pressure chamber;

at least one liquid supply channel, opening out into the pressure chamber, for supplying the liquid at a first temperature to the pressure chamber at a predetermined first level;

at least one liquid discharge channel, originating in the pressure chamber, for discharging the liquid from the pressure chamber from a predetermined second level lying lower than the first level;

at least one steam supply channel, opening out into the pressure chamber, for supplying steam under pressure to the pressure chamber, the steam temperature being higher than the first temperature of the liquid;

the improvement comprising a supply plate provided with a number of plate channels for forming a number of liquid jets in the pressure chamber placed in the mouth of the liquid supply channel, and at least one perforated liquid distribution plate fitted in the liquid supply channel upstream relative to the supply plate and at a distance from the supply plate.

4. In a device for briefly heating a liquid, comprising:

a pressure chamber;

at least one liquid supply channel, opening out into the pressure chamber, for supplying the liquid at a first temperature to the pressure chamber at a predetermined first level;

at least one liquid discharge channel, originating in the pressure chamber, for discharging the liquid from the pressure chamber from a predetermined second level lying lower than the first level;

at least one steam supply channel, opening out into the pressure chamber, for supplying steam under pressure to the pressure chamber, the steam temperature being higher than the first temperature of the liquid;

the improvement comprising a supply plate provided with a number of plate channels for forming a number of liquid jets in the pressure chamber placed in the mouth of the liquid supply channel, and at least one cooling channel in which a cooling agent flows, said at least one cooling channel being provided in the supply plate.

5. In a device for briefly heating a liquid, comprising:

a pressure chamber;

at least one liquid supply channel, opening out into the pressure chamber, for supplying the liquid at a first temperature to the pressure chamber at a predetermined first level;

at least one liquid discharge channel, originating in the pressure chamber, for discharging the liquid from the pressure chamber from a predetermined second level lying lower than the first level;

at least one steam supply channel, opening out into the pressure chamber, for supplying steam under pressure to the pressure chamber, the steam temperature being higher than the first temperature of the liquid;

the improvement comprising a supply plate provided with a number of plate channels for forming a number of liquid jets in the pressure chamber placed in the mouth of the liquid supply channel, the pressure chamber being formed by a hollow cylinder with a vertical axis, which pressure chamber tapers in a conical shape at the bottom side and merges into the liquid discharge channel, while the pressure chamber is shut off at its top side by a cover through which a liquid supply pipe is conveyed, at one end of an insulated part of which pipe projecting into the pressure chamber the supply plate is fitted, and the steam is supplied through a steam supply aperture to the pressure chamber at the level of the supply pipe.

6. Device according to claim 5, wherein at least one steam distribution plate is provided between the inside wall of the cylinder and the outside wall of the liquid supply pipe, below the steam supply aperture.

7. In plant comprising a plurality of devices connected in series for heating a liquid in several stages, each device comprising:

a pressure chamber;

at least one liquid supply channel, opening out into the pressure chamber, for supplying the liquid at a first temperature to the pressure chamber at a predetermined first level;

at least one liquid discharge channel, originating in the pressure chamber, for discharging the liquid from the pressure chamber from a predetermined second level lying lower than the first level;

at least one steam supply channel, opening out into the pressure chamber, for supplying steam under pressure to the pressure chamber, the steam temperature being higher than the first temperature of the liquid;

the improvement comprising a supply plate provided with a number of plate channels for forming a number of liquid jets in the pressure chamber placed in the mouth of the liquid supply channel;

the improvement wherein the liquid supply channel of each device is connected to the liquid discharge channel of the device directly upstream, the liquid discharge channel of the device farthest downstream being connected to a supply channel of a cooling device for separating liquid and steam, and the steam separated off in the cooling device is supplied to at least one of the last but one and upstream plants through the steam supply channel thereof.

8. A plant according to claim 7, wherein the cooling device is made up of a number of partial cooling devices connected in series, the steam separated off in the respective first and downstream partial cooling device being supplied to the respective last but one and upstream device.

* * * * *